(12) United States Patent
Calmon et al.

(10) Patent No.: US 11,361,197 B2
(45) Date of Patent: Jun. 14, 2022

(54) ANOMALY DETECTION IN TIME-SERIES DATA USING STATE INFERENCE AND MACHINE LEARNING

(71) Applicant: EMC IP Holding Company LLC, Hopkinton, MA (US)

(72) Inventors: Tiago Salviano Calmon, Rio de Janeiro (BR); Rômulo Teixeira de Abreu Pinho, Niterói (BR)

(73) Assignee: EMC IP Holding Company LLC, Hopkinton, MA (US)

(*) Notice: Subject to any disclaimer, the term of this patent is extended or adjusted under 35 U.S.C. 154(b) by 1006 days.

(21) Appl. No.: 16/023,110

(22) Filed: Jun. 29, 2018

(65) Prior Publication Data

US 2020/0005096 A1 Jan. 2, 2020

(51) Int. Cl.
*G06N 7/00* (2006.01)
*G06K 9/62* (2022.01)

(52) U.S. Cl.
CPC ......... *G06K 9/6284* (2013.01); *G06K 9/6218* (2013.01); *G06K 9/6262* (2013.01); *G06K 9/6277* (2013.01); *G06N 7/005* (2013.01)

(58) Field of Classification Search
CPC .. G06K 9/6284; G06K 9/6218; G06K 9/6262; G06K 9/6277; G06N 7/005
See application file for complete search history.

(56) References Cited

U.S. PATENT DOCUMENTS

2019/0036795 A1* 1/2019 Ouyang .............. H04L 43/14
2021/0307621 A1* 10/2021 Svenson ............. A61B 5/1171

OTHER PUBLICATIONS

Foroutan, S. Armina, and Farzad R. Salmasi. "Detection of false data injection attacks against state estimation in smart grids based on a mixture Gaussian distribution learning method." IET Cyber-Physical Systems: Theory & Applications 2.4 (2017): 161-171. (Year: 2017).*
Wikipedia. Likelihood function. Page from Jun. 1, 2018. https://en.wikipedia.org/w/index.php?title=Likelihood_function&oldid=843985134. Accessed Nov. 4, 2021. (Year: 2018).*

(Continued)

*Primary Examiner* — Li B. Zhen
*Assistant Examiner* — Markus A. Vasquez
(74) *Attorney, Agent, or Firm* — Ryan, Mason & Lewis, LLP (57) ABSTRACT

Techniques are provided for anomaly detection in time-series data using state inference and machine learning. An exemplary method comprises: obtaining detected states of a plurality of data samples in temporal data, wherein each data sample in the temporal data has a corresponding detected state; obtaining a likelihood that each of the data samples belongs to the corresponding detected state; obtaining a distribution of likelihoods of the data samples indicating a number of observations of each of a plurality of likelihood values; training, using a supervised learning technique, an anomaly detection model that, given the distribution of likelihoods and one or more anomaly thresholds, generates a quality score for each of the anomaly thresholds; and selecting at least one anomaly threshold based on the quality score, wherein the trained anomaly detection model is applied to detect anomalies in new temporal data samples using the selected at least one anomaly threshold.

20 Claims, 9 Drawing Sheets

100

110: DETECT STATES OF DATA SAMPLES IN TEMPORAL DATA;

120: OBTAIN LIKELIHOOD THAT EACH DATA SAMPLE BELONGS TO CORRESPONDING DETECTED STATE;

130: OBTAIN LIKELIHOOD DISTRIBUTION OF DATA SAMPLES INDICATING NUMBER OF OBSERVATIONS OF EACH LIKELIHOOD VALUE;

140: TRAIN ANOMALY DETECTION MODEL THAT, GIVEN LIKELIHOOD DISTRIBUTION AND ANOMALY THRESHOLDS, GENERATES QUALITY SCORE FOR EACH ANOMALY THRESHOLD;

150: SELECT ANOMALY THRESHOLD BASED ON QUALITY SCORE; AND

160: APPLY TRAINED ANOMALY DETECTION MODEL WITH SELECTED ANOMALY THRESHOLD TO DETECT ANOMALIES IN NEW TEMPORAL DATA SAMPLES.

(56) References Cited

OTHER PUBLICATIONS

J. Lücke et al, "k—Means is a Variational EM Approximation of Gaussian Mixture Models," arXiv, 2017.
Rabiner et al., "An introduction to hidden Markov models," ieee assp magazine, vol. III, No. 1, pp. 4-16, 1986.

* cited by examiner

FIG. 1

- 110: DETECT STATES OF DATA SAMPLES IN TEMPORAL DATA;
- 120: OBTAIN LIKELIHOOD THAT EACH DATA SAMPLE BELONGS TO CORRESPONDING DETECTED STATE;
- 130: OBTAIN LIKELIHOOD DISTRIBUTION OF DATA SAMPLES INDICATING NUMBER OF OBSERVATIONS OF EACH LIKELIHOOD VALUE;
- 140: TRAIN ANOMALY DETECTION MODEL THAT, GIVEN LIKELIHOOD DISTRIBUTION AND ANOMALY THRESHOLDS, GENERATES QUALITY SCORE FOR EACH ANOMALY THRESHOLD;
- 150: SELECT ANOMALY THRESHOLD BASED ON QUALITY SCORE; AND
- 160: APPLY TRAINED ANOMALY DETECTION MODEL WITH SELECTED ANOMALY THRESHOLD TO DETECT ANOMALIES IN NEW TEMPORAL DATA SAMPLES.

1. GET NORMALIZED FREQUENCIES ASSOCIATED WITH EACH BIN OF LOG-LIKELIHOOD HISTOGRAM OF ONE TIME-SERIES;

2. GET THRESHOLD FROM A PREDEFINED RANGE;

3. CREATE A VECTOR COMPOSED OF $K$ BINS AND A THRESHOLD, COMPOSING A $(K+1)$-DIMENSIONAL VECTOR;

4. REPEAT STEPS 2 AND 3 FOR SAME HISTOGRAM, EACH TIME PICKING A DIFFERENT THRESHOLD FROM PREDEFINED RANGE;

5. REPEAT STEPS 1, 2 AND 3 FOR EACH TIME-SERIES OF TRAINING DATA SET;

6. COMPUTE F1-SCORE RELATED TO EACH COMBINATION OF BINS AND THRESHOLD;

7. COMBINE MULTI-DIMENSIONAL VECTORS AND THEIR RESPECTIVE F1-SCORE AS INPUT TO THE TRAINING MODEL; AND

8. TRAIN REGRESSION MODEL USING DATA GENERATED IN STEP 7.

ANOMALY DETECTION IN TIME-SERIES DATA USING STATE INFERENCE AND MACHINE LEARNING

FIELD

The field relates generally to techniques for anomaly detection.

BACKGROUND

Anomaly detection systems are widely applied in contexts with inherent complexity and large volumes of data, such as data center management, industrial applications and in financial scenarios. In data center management and resource administration, for example, the number of possible system states can be overwhelming, and neglecting anomalies may lead to malfunction, failures and/or a sub-optimal allocation of resources. All of these problems may ultimately result in financial loss and long term operational problems.

In these scenarios, proper detection of anomalies empowers decision makers to derive an action plan for each state of interest, either by preventing a disruptive effect on subsequent states, triggering self-tuned policies to handle such events or triggering a timely manual intervention to reduce losses. A need exists for improved techniques for real-time anomaly detection.

SUMMARY

Illustrative embodiments of the present disclosure provide techniques for anomaly detection in time-series data using state inference and machine learning. In one embodiment, an exemplary method comprises: obtaining one or more detected states of a plurality of data samples in temporal data, wherein each of the data samples in the temporal data has a corresponding detected state; obtaining a likelihood (such as a log likelihood) that each of the data samples belongs to the corresponding detected state; obtaining a distribution of likelihoods of the data samples indicating a number of observations of each of a plurality of likelihood values; training, using a supervised learning technique, an anomaly detection model that, given the distribution of likelihoods and one or more anomaly thresholds, generates a quality score for each of the one or more anomaly thresholds; and selecting at least one anomaly threshold based on the quality score, wherein the trained anomaly detection model is applied to detect anomalies in new temporal data samples using the selected at least one anomaly threshold.

In some embodiments, the trained anomaly detection model detects anomalies in the new temporal data samples by comparing one or more of the new temporal data samples to the selected at least one anomaly threshold of the trained anomaly detection model.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for anomaly detection in time-series data using state inference and machine learning.

One or more aspects of the disclosure recognize that anomalous behavior might be challenging to detect due to the generation of large amounts of data resulting from different states of operation. This problem can be aggravated by the fact that even the number of states might not be known in advance.

In one or more embodiments, a framework is provided for anomaly detection that employs information from multiple sets of time-series data streams generated by a similar process. The disclosed anomaly detection system detects the underlying time-series states and evaluates a likelihood with which time-series samples are associated with the detected states. In some embodiments, such likelihoods are an important element in determining whether samples (e.g., observations over time) are normal or anomalous. The exemplary anomaly detection techniques are based on histograms of likelihood values and machine learning models to automatically learn thresholds to separate normal behavior from anomalous behavior.

A characteristic of complex scenarios is the large volume of data generated by monitoring systems. Typically, the data comprises sets of time series. For example, in the context of the data center management domain, a single data center may contain thousands of sensors with sampling rates as frequent as milliseconds, generating large volumes of time-series data. Monitoring and detecting operational anomalies in complex domains require an approach that is capable of dealing with such large volumes of data.

In a dynamic system, such as a data center, detection of anomalies in time-series data is often challenging because it is difficult to obtain a correct identification of normal operating states and a correct identification of anomalies in those states.

Sets of time series typically configure sparse high-dimensional state-spaces. Thus, the number of identifiable states in a set of time-series data may be too large for a naïve brute-force computation. In complex domains, the number of distinct relevant states might even be unknown beforehand. Furthermore, considering that sequences of states configure events, this large number of states can lead to a combinatorial explosion of the number of identifiable events.

In a complex dynamic system, such as that of a data center, the observations configuring a new (albeit valid) mode of operation should not be classified as anomalous behavior. For example, the same observation (e.g., the shutting down of certain resources in a data center) may be considered anomalous in one case (e.g., operational faults) and not in another (e.g., for a programmed maintenance shut down). A need therefore exists for techniques for identifying such temporal states.

The anomaly detection literature states that anomalies differ from outliers in the sense that the former leads to an action, while the latter tends to be more for informational or statistical purposes. With that in mind, anomalies should be correctly detected so that the related actions are executed at the right time. A large number of missed anomalies (e.g., false negatives) may lead to undetected root causes for problems or preventative actions not being triggered. Conversely, false alarms (e.g., false positives) may lead to unnecessary actions being taken. The main difficulty in this process is to find a detection mechanism that is accurate and that generalizes well, so that the model does not need to be adjusted frequently. A need therefore exists for techniques for generalizing the anomaly classification process.

In one or more embodiments of the present disclosure, distinctions are made between regular data and anomalous data in time series with well-defined states. In some embodiments, the disclosed anomaly detection system works in three stages. First, a state detection procedure is performed on the data. Thereafter, in a second procedure, a likelihood assessment is performed. In this step, a likelihood that each observation within the data belongs to its assigned cluster is evaluated. Finally, the third procedure separates observations into normal and anomalous classes, based on the computed likelihoods.

Separating regular data from anomalous data can be performed in a number of different ways. The disclosed technique, in one or more embodiments, is based on the likelihood of belonging to each discovered time-series state in order to separate data. By using a threshold over a normalized histogram, one can determine the point at which the log-likelihood is considered to be the substantially minimum necessary for the data to be considered regular.

One or more aspects of the disclosure recognize that the relationship between bins in histograms, thresholds and a quality score for detected anomalies is a non-trivial, possibly non-linear, relationship. One or more embodiments of the disclosure provide an algorithm that generalizes to previously unseen data. Some embodiments employ a set of annotated data to infer the relationship between the histogram profiles, thresholds and the quality of the anomaly detection engine. When a new, non-annotated piece of data is gathered and further analyzed, the trained model is used to predict the performance for several different values of thresholds and to select the one threshold that produces the substantially maximum predicted value.

Figure 1:
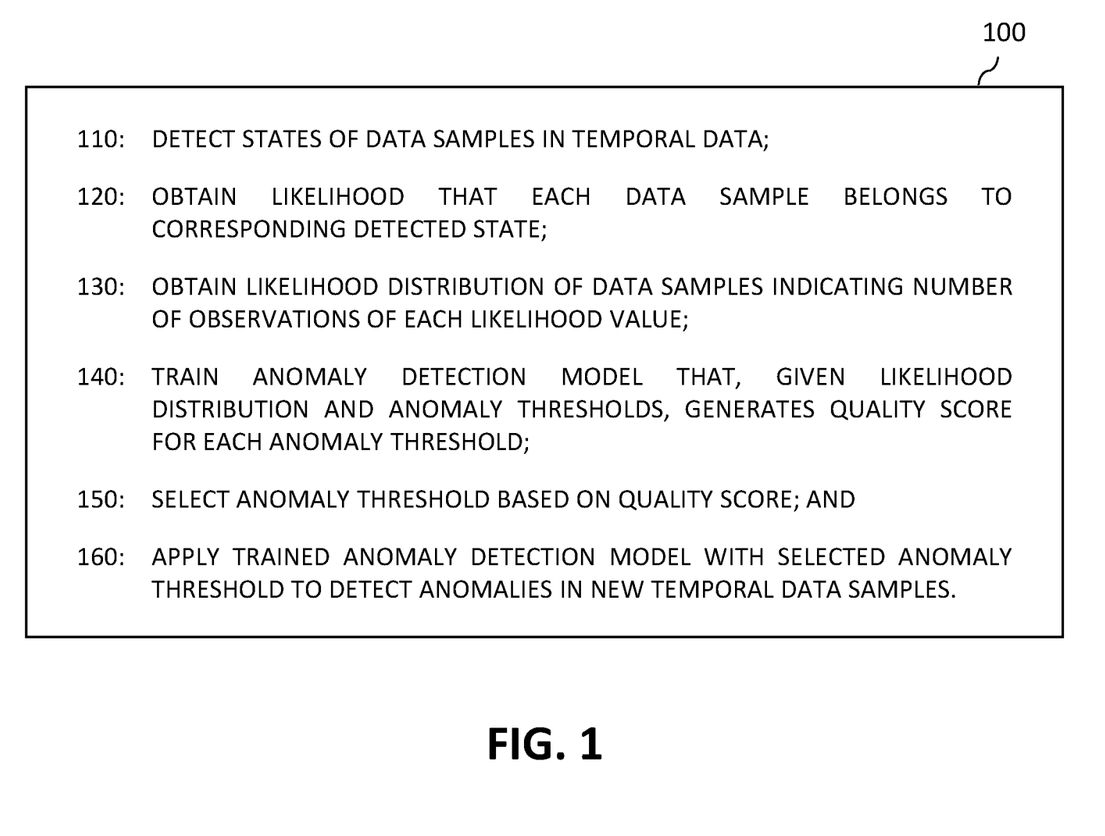
FIG. 1 illustrates pseudo code for an exemplary implementation of an anomaly detection process, according to one embodiment of the disclosure.

FIG. 1 illustrates pseudo code for an exemplary implementation of an anomaly detection process 100, according to one embodiment of the disclosure. As shown in FIG. 1, the exemplary anomaly detection process 100 comprises the following steps:

110: detect states of data samples in temporal data;
120: obtain likelihood that each data sample belongs to corresponding detected state;
130: obtain likelihood distribution of data samples indicating a number of observations of each likelihood value;
140: train anomaly detection model that, given likelihood distribution and anomaly thresholds, generates a quality score for each anomaly threshold;
150: select anomaly threshold based on a substantially maximum predicted quality score; and
160: apply trained anomaly detection model with selected anomaly threshold to detect anomalies in new temporal data samples.

The various steps of the exemplary anomaly detection process 100 are discussed hereinafter.

State Detection

As discussed above, the first stage of the exemplary anomaly detection techniques is the state discovery stage, in which the data is analyzed and grouped into clusters. This step can be performed with simple clustering algorithms, such as k-means (see, for example, J. Lucke and a. D. Forster, "k-Means is a Variational EM Approximation of Gaussian Mixture Models," arXiv, 2017), or with other clustering algorithms that take the structure of the data generation process as inputs.

In particular, the field of time-series analysis offers methods to cluster data using their temporal information. While this can be achieved using traditional clustering techniques on the space-time domain, such as Gaussian Mixture Models (GMMs), Hidden Markov Models (HMMs) also provide a natural structure to handle this kind of problem. The Baum-Welch algorithm (see, for example, L. Rabiner and B. Juang, *An Introduction to Hidden Markov Models*, IEEE ASSP MAGAZINE, 1986, Vol. III, No. 1, at 4, 4-16), is particularly suited to the inference of (hidden) states from temporal data.

The result of this first stage, which will be used by the next steps, is an association between each data point and a detected state.

Figure 2A:
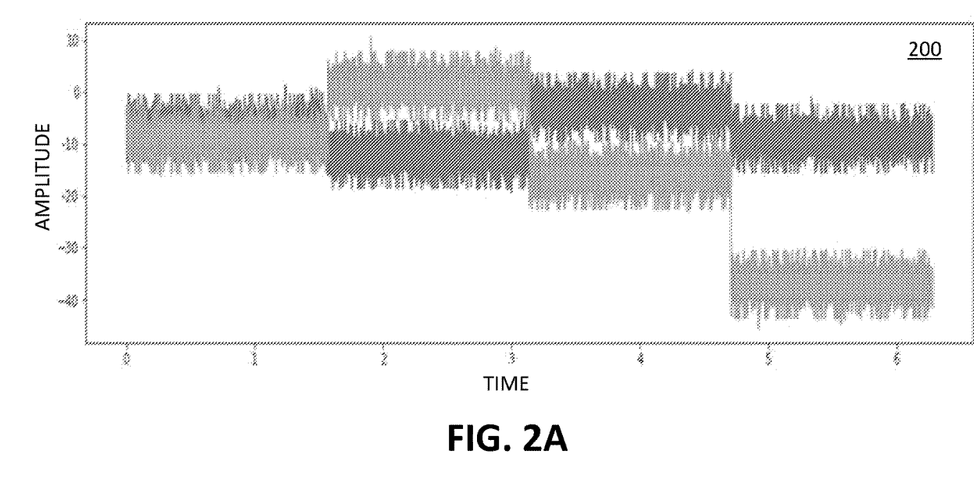
FIG. 2A illustrates exemplary multi-dimensional time-series data.
Figure 2B:
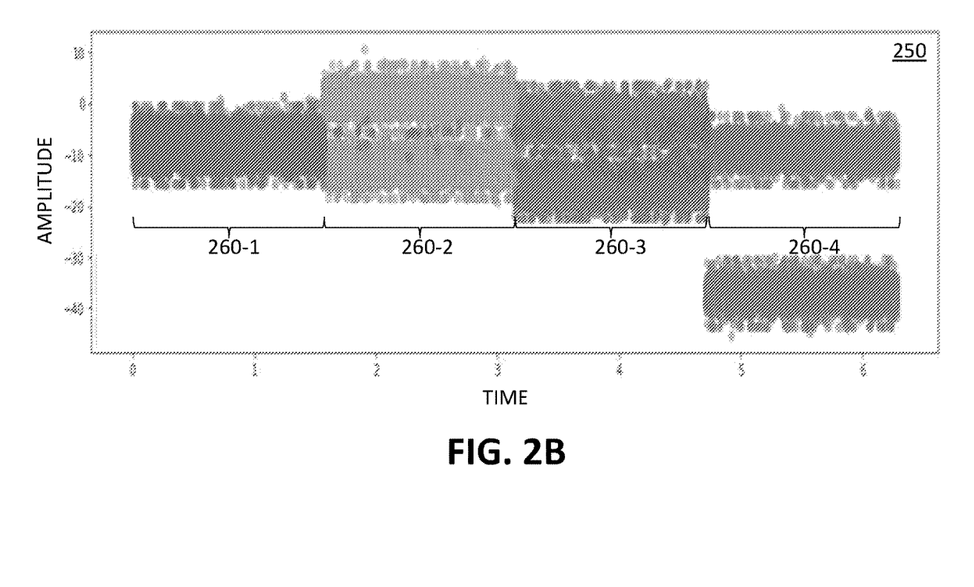
FIG. 2B illustrates an exemplary state assignment for the exemplary multi-dimensional time-series data of FIG. 2A, according an embodiment.

FIG. 2A illustrates exemplary multi-dimensional time-series data 200 for two dimensions of the time series (distinguished by shades of grey in FIG. 2A). FIG. 2B illustrates an exemplary state assignment 250 for the exemplary multi-dimensional time-series data 200 of FIG. 2A into, for example, one of four predefined exemplary states 260-1 through 260-4.

As shown in FIG. 2B, the exemplary multi-dimensional time-series data 200 over time is primarily assigned to one of the indicated predefined states 260-1 through 260-4. It is noted, however, that FIG. 2B illustrates some misclassified state assignments for a portion of the time-series data samples. For example, within the time region assigned to states 260-2 and 260-3, there are some data samples that were misclassified as state 260-1.

Likelihood Extraction Phase

As discussed above, the second stage of the exemplary anomaly detection techniques takes the raw data points and the description of the states to extract the likelihood of each data point belonging to each state. For this, each state detected in the first stage above provides a substantially minimal description of the probability distribution associated with it. In some methods, such as HMMs and GMMs, the distribution is a natural outcome of the algorithms. For methods where this information is not available, the probability distribution is computed through modelling a probability distribution from the samples already associated with each cluster. The mechanism needs access to all of the parameters that are sufficient to describe each one of these distributions to compose the complete distribution for each state. Then, the likelihood extraction is just a measure of how likely data points are to belong to a certain cluster.

In one or more embodiments, a log-likelihood is computed, instead of the likelihood, as follows:

$$L(x|\theta)=\ln(p_\theta(x)), \quad (1)$$

which provides the log-likelihood of observation x in a probability distribution parametrized by θ.

The log-likelihood is a monotonically increasing function, which preserves the ordinal characteristics of the original probability function. The log-likelihood has the additional benefit of transforming products of probabilities into sums of logarithms and small probability values into large negative ones, which mitigates possible underflows in computations. Finally, in the case of Gaussian distributions (and other exponential functions), the log-likelihood avoids the evaluation of an exponential, which is computationally expensive.

The log-likelihood of all points in the set, in itself, also describes a (discrete) probability distribution. Such a distribution can be seen via a histogram. This histogram will typically have a lot of observations with a high log-likelihood value and a few observations with lower values, thus defining a negatively skewed distribution.

Figure 3:
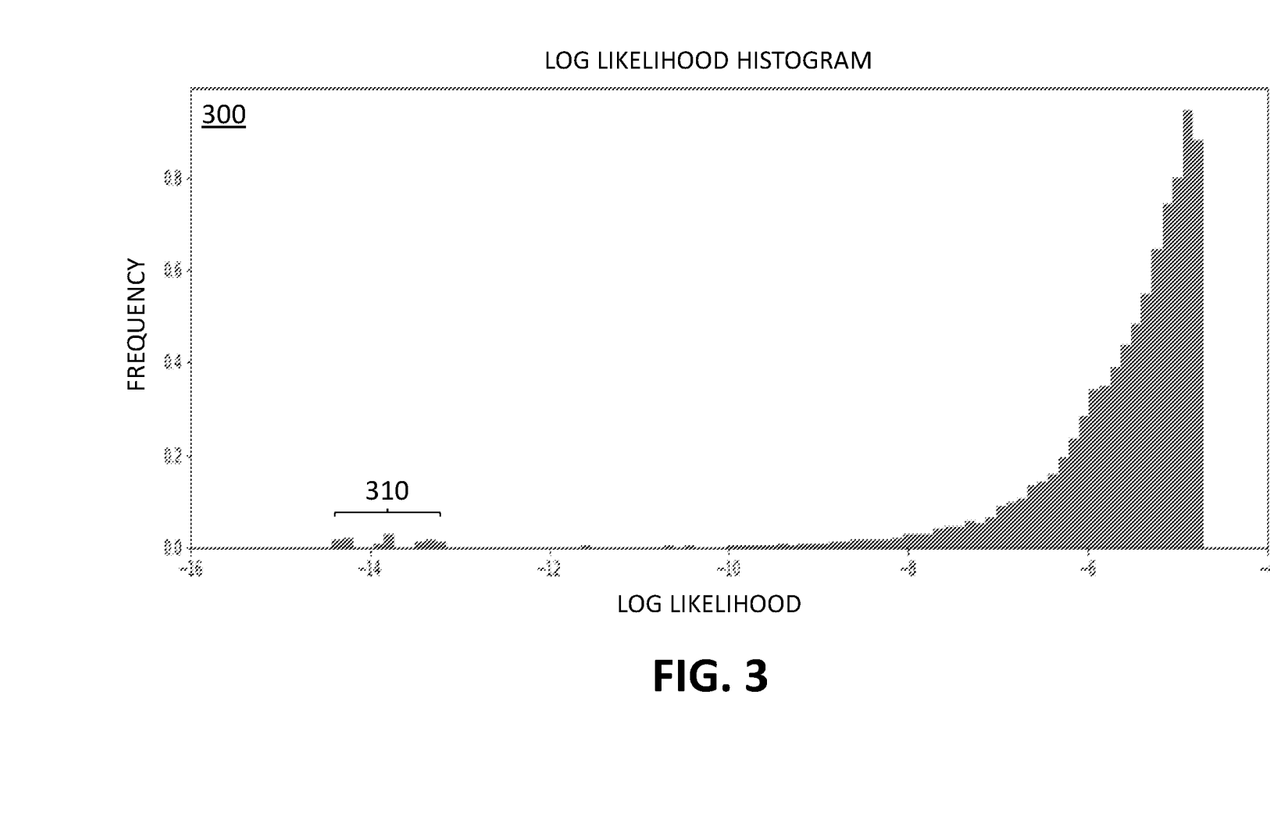
FIG. 3 illustrates a log-likelihood distribution of time-series samples in a data set, according to some embodiments of the disclosure.

FIG. 3 illustrates a log-likelihood distribution 300 of time-series samples in a data set, according to some embodiments of the disclosure. Generally, the log-likelihood distribution 300 indicates the number of observations (frequency) of each of the log-likelihood values.

As shown in FIG. 3, the points in group 310 with lower log-likelihood values are those for which the clustering technique was not entirely sure about to which state it should assign them. From a geometric point of view, such points in group 310 tend to be far from the center of the clusters to which they were assigned during the state detection phase. Those outlier points in group 310 are assumed to be potential anomalies to be detected, as discussed further below in conjunction with FIG. 4.

Figure 4:
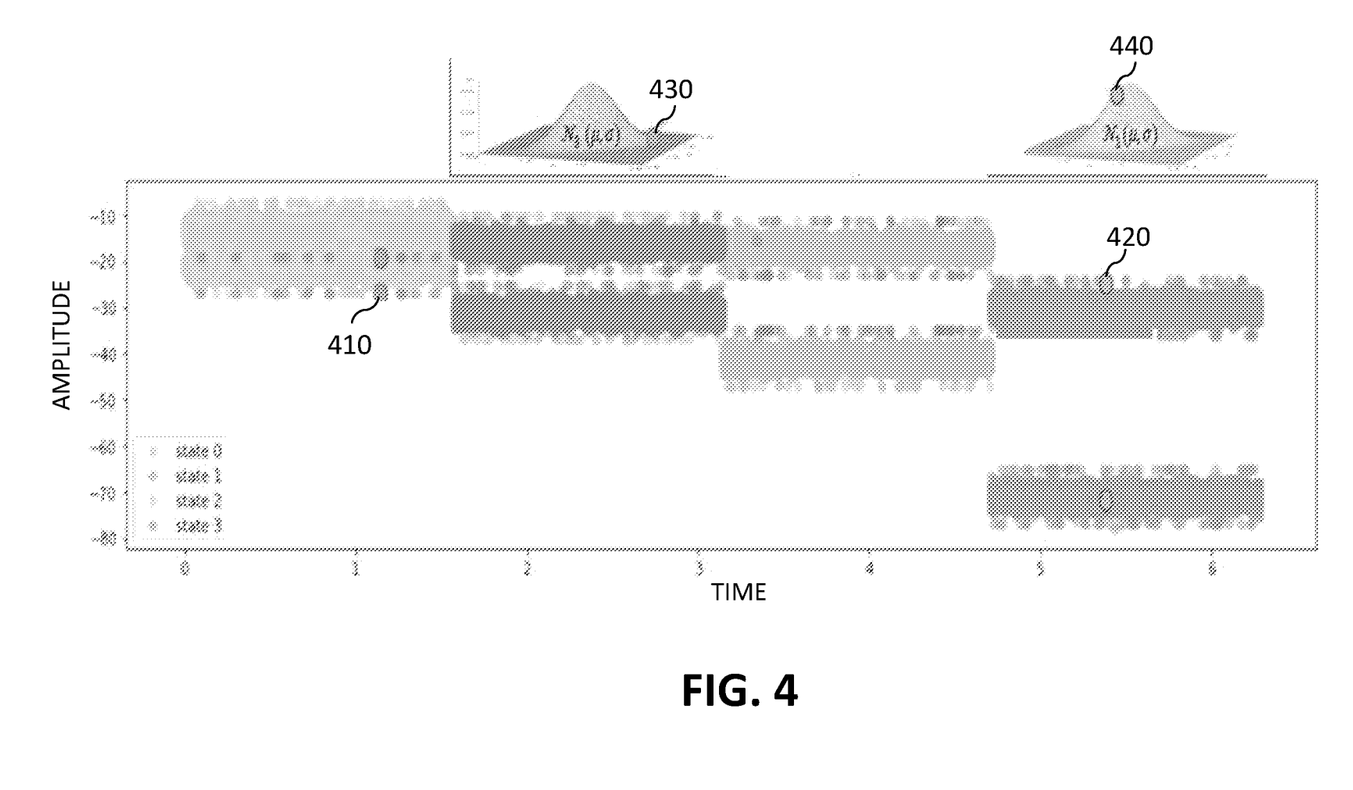
FIG. 4 illustrates a likelihood assessment of anomalies in states represented by multivariate Gaussian distributions, according to one or more embodiments of the disclosure.

FIG. 4 illustrates a likelihood assessment of anomalies in states represented by multivariate Gaussian distributions, according to some embodiments of the disclosure. As noted above, FIG. 2B illustrates some misclassified state assignments for a portion of the time-series data samples. For example, as shown in FIG. 4, a data sample 410 was misclassified with a wrong state assignment and is therefore a potential anomaly. Likewise, a data sample 420 was classified with a different, but correct, state assignment relative to nearby data samples, and is therefore associated with normal system behavior.

Generally, the multi-dimensional probability distribution 430 (where the z axis indicates the probability) shown in FIG. 4 illustrates a data sample having a low probability and thus is a potential anomaly. Likewise, the probability distribution 440 shown in FIG. 4 illustrates a data sample having a high probability and thus is associated with normal system behavior.

Anomaly Detection Phase

As discussed above, the third stage of the exemplary anomaly detection techniques finds a threshold in the log-likelihood histogram to separate regular data from anomalous data. The discovery of this threshold can be challenging and is affected by a number of factors, some of which are the probability of anomalies in the data, the level of aberrance of these anomalies, the presence of noise in the data, the technique used to infer states, and many others. It is often challenging to discover a threshold using just the histogram in such a way that the solution generalizes to different time-series settings.

Figure 5:
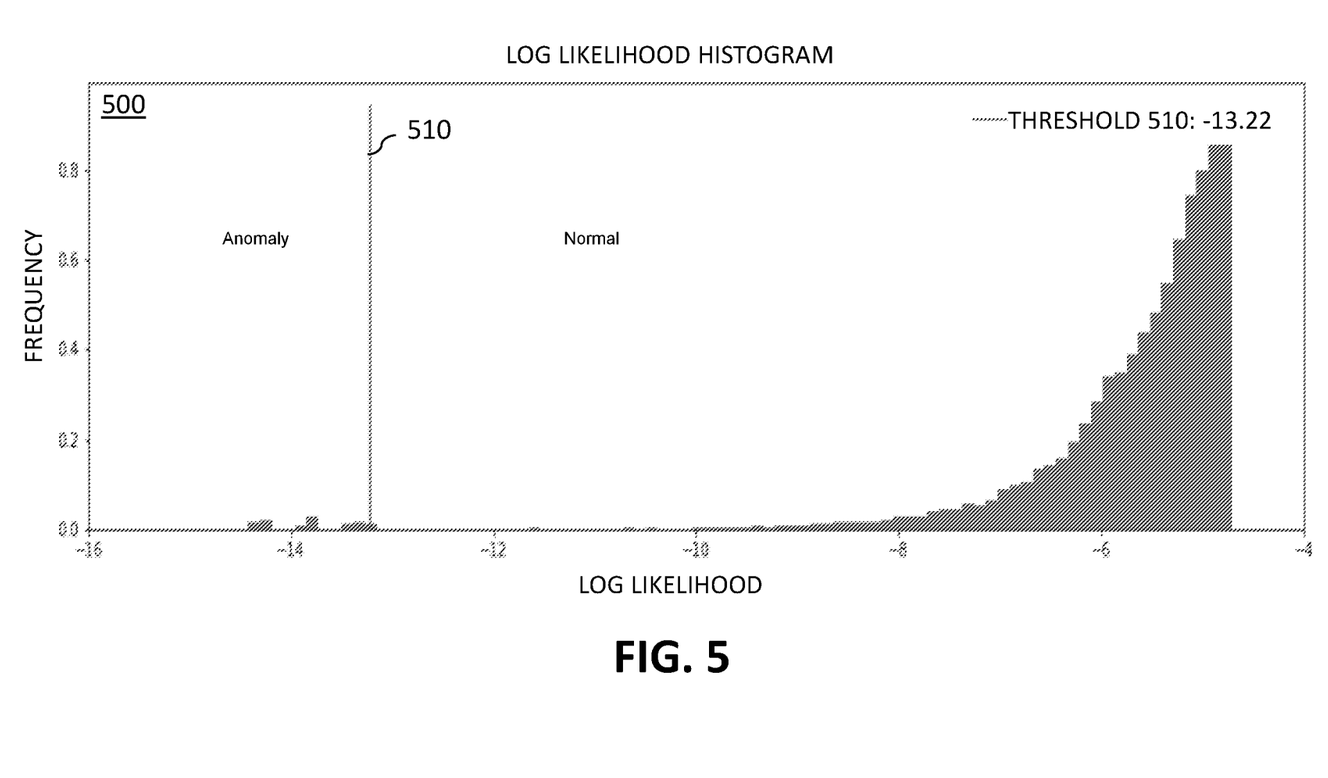
FIG. 5 illustrates an exemplary log-likelihood threshold for a log-likelihood distribution of time-series samples in a data set, according to one embodiment.

FIG. 5 illustrates an exemplary log-likelihood threshold 510 for a log-likelihood distribution 500 of time-series samples in a data set, according to some embodiments of the disclosure. Generally, the determined log-likelihood threshold 510 is applied to the data samples to distinguish between normal and anomalous time-series samples.

In one or more embodiments, the exemplary method employs a supervised machine learning approach using the histogram of likelihoods. In this approach, a training data set is used in which anomalous time-series samples are properly labeled as such (the ground truth). The objective is to build a trained model to find anomalies in new, unlabeled data. The model parameters are adjusted using the training time-series samples as input and training labels as output. As the parameters are iteratively adjusted, the model predicts anomaly labels for the training time-series samples. These predictions are compared to the ground truth, and the model is adjusted so as to maximize a quality metric for the prediction. The quality metric used in some exemplary embodiments is the F1-score (Equation 2, below), which combines the number of hits (or true positives, "TP", when the model prediction matches the ground truth), misses (false negatives, "FN") and false alarms (false positives, "FP"). The F1-score is particularly suited to anomaly detection because it is not affected by true negatives (TN), which potentially introduce a large bias due to class imbalance.

$$F_1 = \frac{2TP}{2TP + FN + FP}. \quad (2)$$

In one or more embodiments, the exemplary method employs a training phase and a test phase. In the training phase, the model parameters are adjusted to substantially optimize the F1-score on the training data. In the test phase, the model with the substantially optimal parameters is applied to the test data, and the F1-score on the test data is computed to evaluate the model's generalization capabilities.

Threshold Prediction—Training Phase

A machine learning (ML) algorithm is initially applied to learn the substantially optimal threshold for the histogram (or log-likelihood distribution) associated with each time series of the training data set. The substantially optimal threshold is the one that yields the highest F1-score, in some embodiments. In the method disclosed herein, the ML algorithm takes as input the frequencies associated with each bin of each histogram and a threshold, and generates an F1-score as output. Generally, the model will adjust its parameters in such a way as to predict, for each input configuration, what is the expected F1-score. In the end, the determined log-likelihood threshold 510 is the one that yields the substantially highest F1-score.

The above approach is known as a regression method. Various ML regression methods achieve varied success in the present problem. In at least one embodiment of this disclosure, the ML algorithm is a Support Vector Regression (SVR), which works well for non-linear problems (see, for example, V. Vapnik, *The Nature of Statistical Learning Theory*, Springer Science & Business Media (2013)). This particular feature is important, since the relationship between each bin of the histogram, the chosen threshold and the produced F1-score are not assumed to be linear.

Figure 6:
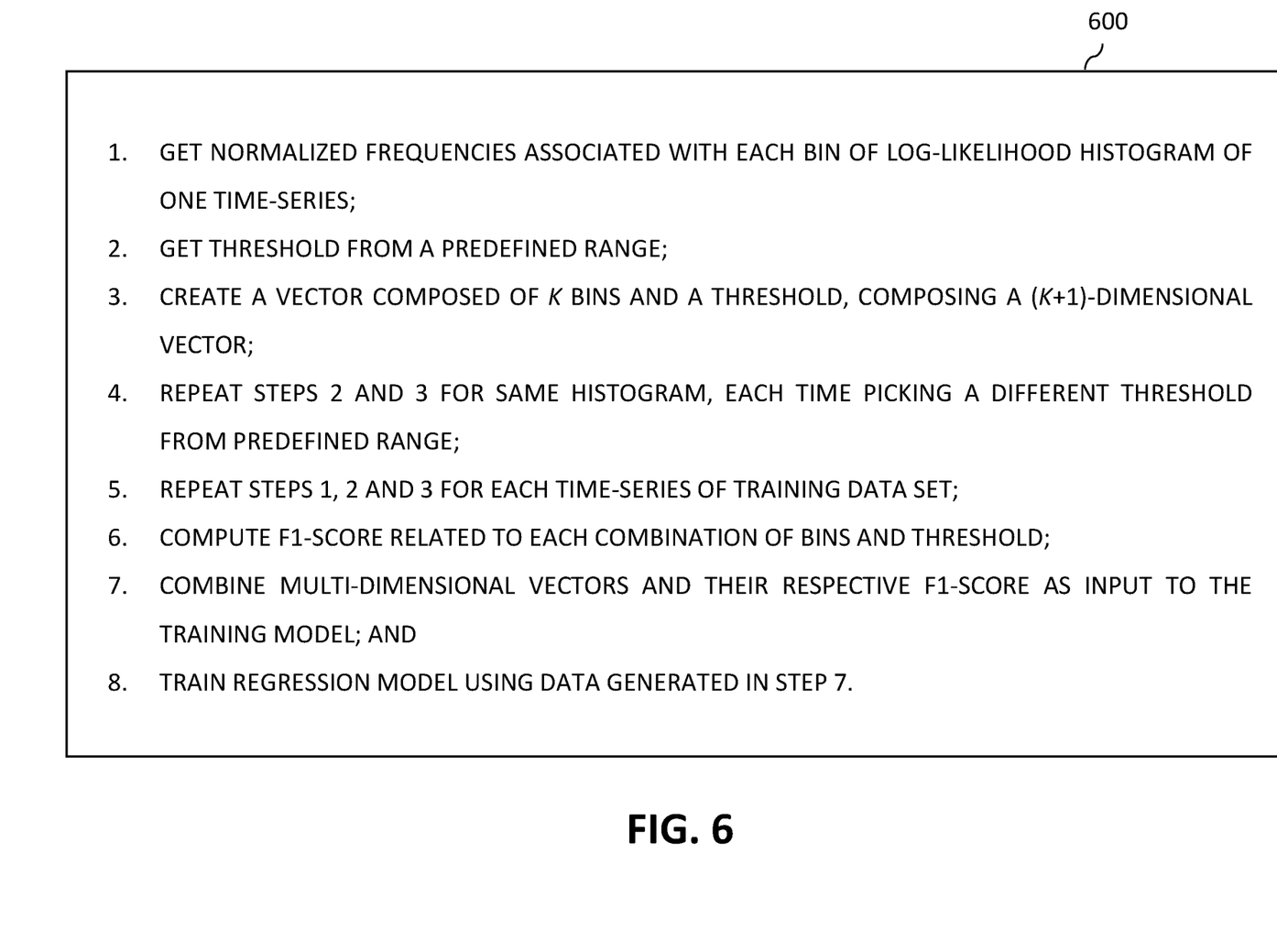
FIG. 6 illustrates exemplary pseudo code for a training process, according to an embodiment of the disclosure.

FIG. 6 illustrates exemplary pseudo code for a training process 600, according to one embodiment of the disclosure. As shown in FIG. 6, the exemplary training process 600 comprises the following steps:

1. Get the normalized frequencies associated with each bin of the log-likelihood histogram of one time series;
2. Get a threshold from a predefined range;
3. Create a vector composed of k bins and a threshold, composing a (k+1)-dimensional vector;
4. Repeat steps 2 and 3 for the same histogram, each time picking a different threshold from the predefined range;
5. Repeat steps 1, 2 and 3 for each time-series of the training data set;
6. Compute the F1-score related to each combination of bins and threshold;
7. Combine the multidimensional vectors and their respective F1-score as the input of the training model; and
8. Train a regression model using the data generated in step 7.

Figure 7:
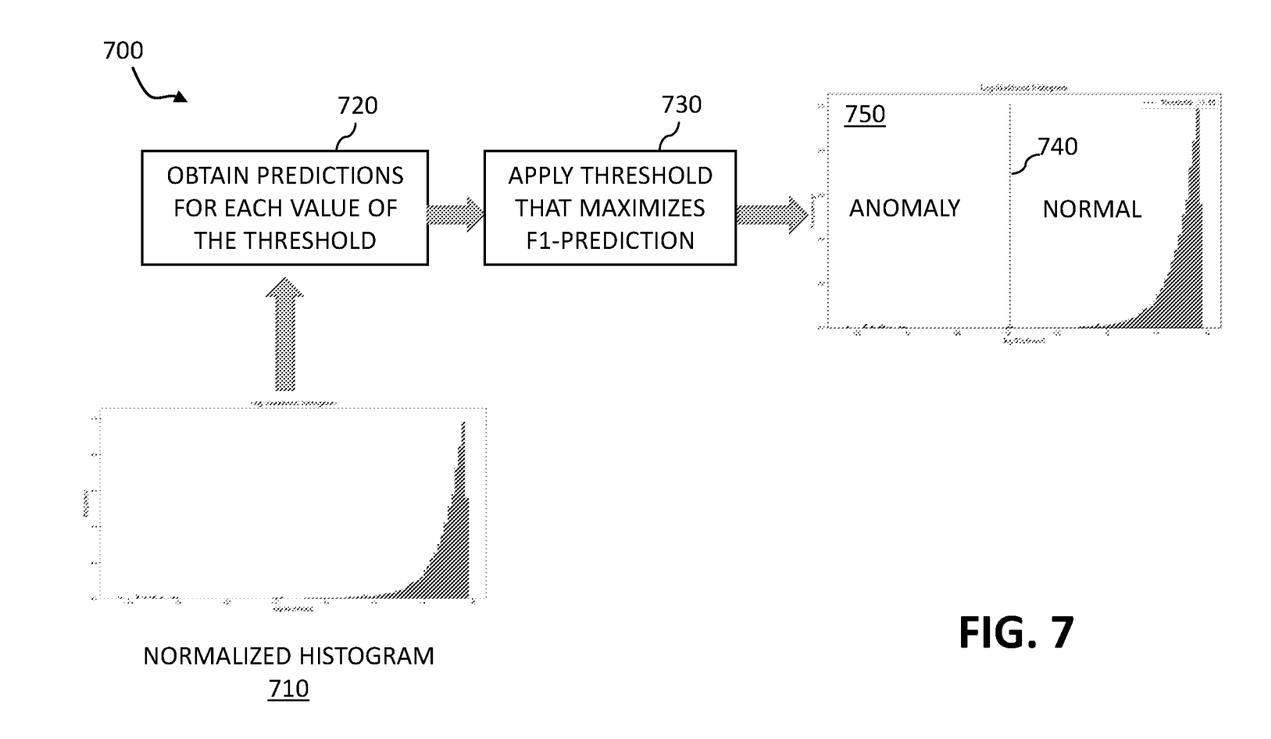
FIG. 7 is a flow chart illustrating an exemplary implementation of a threshold discovery process, according to one embodiment of the disclosure.

FIG. 7 is a flow chart illustrating an exemplary implementation of a threshold discovery process 700, according to one embodiment of the disclosure. As shown in FIG. 7, the exemplary threshold discovery process 700 initially obtains a normalized histogram 710 that is similar to the log-likelihood distribution 300 of FIG. 3. During step 720, the exemplary threshold discovery process 700 obtains predictions for each value of the threshold. A threshold 740 is applied during step 730 that maximizes the F1-prediction score for the log-likelihood distribution 750 that is similar to the log-likelihood distribution 500 of FIG. 5.

Threshold Prediction—Testing Phase

The trained model can now be used to predict anomalies in previously unseen time series. The test phase serves the purpose of evaluating model performance on new data sets. The test data set thus also includes labeled time-series data so that the F1-score can be computed in order to evaluate how the model generalizes to previously unseen data.

In one or more embodiments, each new time series in the test data set needs to be clustered into states, and a log-likelihood metric needs to be extracted for each of its samples. Both of these processes are unsupervised, which means state labels are not necessary for them to work.

Thereafter, the histogram of log-likelihoods is computed and normalized. The histogram and a threshold value are given as inputs to the previously trained SVR, which will produce a prediction of the F1-score generated by that specific combination. This step is repeated across the predefined threshold range, and this will produce a curve that relates thresholds to predicted F1-scores for that particular histogram. Finally, the threshold that generates the maximum predicted F1-score is chosen as the threshold that separates anomalous data from regular data.

EXAMPLE

In a data center, multiple machines emit the same kind of telemetry to the end-user. This includes multiple time series of physical aspects, such as Voltage and Temperature, and usage aspects, such as CPU (central processing unit) utilization, allocated memory and cache hit rate, among others. Composing a state space of each single machine using all of such measurements or observations is a challenging task. The high dimensionality of the composed observation space makes it naturally sparse, and several possible states might occur only a few times or even never reoccur. Furthermore, the amount of states in such a scenario may not be known beforehand, and, as a consequence, anomaly detection engines crafted for every state is not a possibility.

Furthermore, imagine a particular data center is suffering from random temperature spikes. These spikes might lead to a malfunction and even early breakdowns, disrupting all or portions of the business operations and requiring manual interference of the system administrator for restoration.

The disclosed anomaly detection methodology detects anomalies even in a previously unknown number of operating states. Thus, the information generated by the disclosed anomaly detection system can be analyzed and be acted upon before the disruptive events occur.

Thus, in at least one embodiment, the disclosed anomaly detection system does not require explicit knowledge of the complete time-series generation process and works in a completely unsupervised setting. Among other benefits, the exemplary anomaly detection system provides a state detection process that automatically converges to a substantially best set of states for each particular time series. Additionally, the separation of observations into normal and anomalous samples is turned into a general model that is, at the same time, capable of improving the separation parameters for each series (into, for example, anomalies and normal states).

In some embodiments, the disclosed anomaly detection techniques detect anomalies without explicit knowledge of the complete time-series generation process and do so in an unsupervised setting. A state detection process that automatically converges to a substantially best set of states for each particular time series is provided. Observations are separated into normal and anomalous samples using a general model which is capable of improving the separation parameters for each series (into, for example, anomalies and normal states).

One or more embodiments of the disclosure provide improved methods, apparatus and computer program products for anomaly detection in time-series data. The foregoing applications and associated embodiments should be considered as illustrative only, and numerous other embodiments can be configured using the techniques disclosed herein in a wide variety of different applications.

It should also be understood that the disclosed anomaly detection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for anomaly detection in time-series data may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, computer services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors, with each hypervisor providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based anomaly detection engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based anomaly detection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
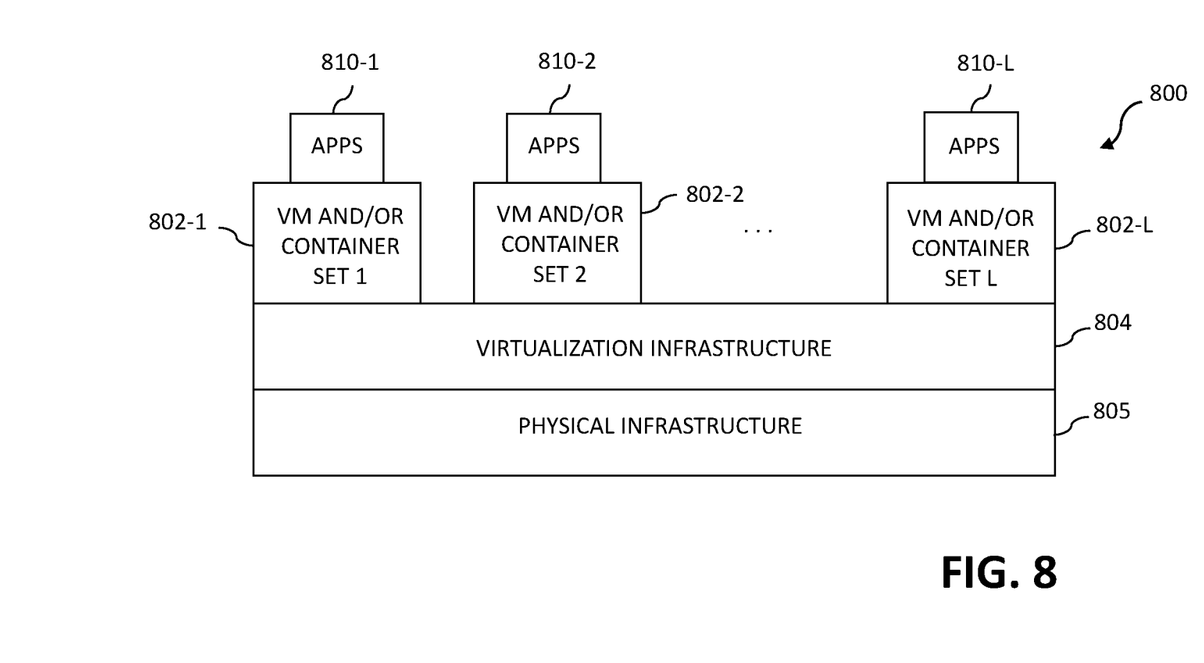
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the disclosed anomaly detection system. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide anomaly detection functionality of the type described above for one or more processes running on a given one of the VMs. For example, each of the VMs can implement anomaly detection logic for providing anomaly detection functionality for one or more processes running on that particular VM.

An example of a hypervisor platform that may be used to implement a hypervisor within the virtualization infrastructure 804 is the VMware® vSphere®, which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality such as support for Docker containers running on bare metal hosts, or Docker containers running on VMs. The containers are illustratively implemented using respective kernel control groups of the operating system. Such implementations can provide anomaly detection functionality of the type described above for one or more processes running on different ones of the containers. For example, a container host device supporting multiple containers of one or more container sets can implement one or more instances of anomaly detection logic.

As is apparent from the above, one or more of the processing modules or other components of the disclosed anomaly detection system may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
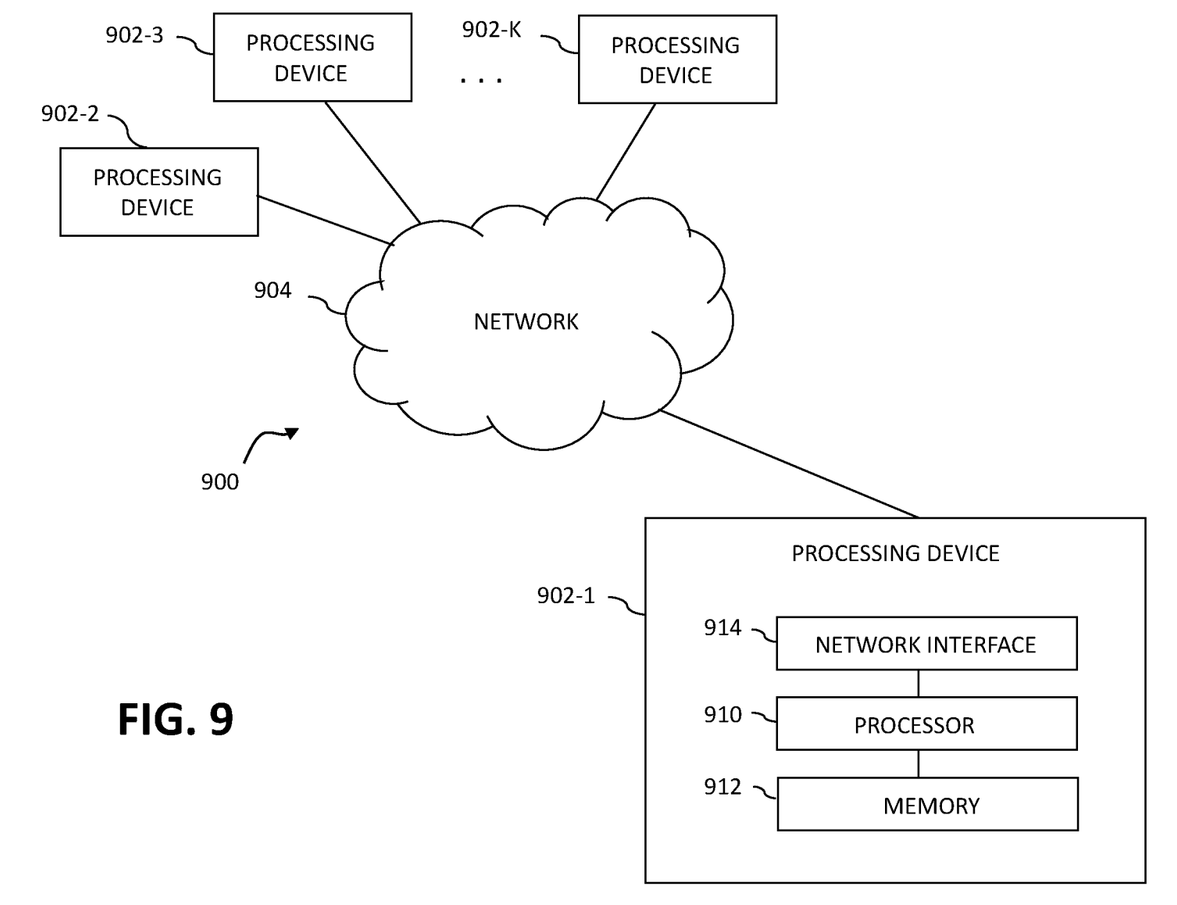
FIG. 9 illustrates another exemplary processing platform that may be used to implement at least a portion of one or more embodiments of the disclosure.

Multiple elements of system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining one or more detected states of a plurality of data samples in temporal data, wherein each of the data samples in said temporal data has a corresponding detected state;
obtaining a likelihood that each of said data samples belongs to said corresponding detected state;
obtaining a distribution of the likelihoods of the data samples indicating a number of observations of each of a plurality of likelihood values;
training, by at least one processing device, using a supervised learning technique, and using a training dataset comprising the distribution of the likelihoods, a plurality of anomaly thresholds, and a corresponding quality score for each anomaly threshold of the plurality of anomaly thresholds indicating a performance of detecting anomalies in the plurality of data samples using the corresponding anomaly threshold, a first machine learning model, wherein training the first machine learning model comprises adjusting one or more parameters of the first machine learning model to predict the corresponding quality score for each combination of: (i) the distribution of the likelihoods and (ii) each of the anomaly thresholds;
selecting, by the at least one processing device and using the first machine learning model, at least one anomaly threshold to apply to new temporal data samples; and
configuring a second machine learning model for anomaly detection using at least the selected at least one anomaly threshold, wherein the second machine learning model for anomaly detection is applied to detect anomalies in the new temporal data samples.

2. The method of claim 1, wherein the distribution of the likelihoods is an aggregation of the likelihoods that each data sample belongs to said corresponding detected state.

3. The method of claim 1, further comprising the step of clustering the data samples from the temporal data into a plurality of clusters using temporal information, wherein each of the plurality of clusters corresponds to one detected state.

4. The method of claim 3, wherein the likelihood that each of said data samples belongs to said corresponding detected state is obtained from a probability distribution provided by the clustering step.

5. The method of claim 1, wherein the likelihood comprises a log likelihood.

6. The method of claim 1, further comprising a testing phase that evaluates a performance of the second machine learning model for anomaly detection on new labeled temporal data samples.

7. The method of claim 1, wherein the second machine learning model for anomaly detection detects anomalies in the new temporal data samples by comparing one or more of the new temporal data samples to the selected at least one anomaly threshold.

8. A computer program product, comprising a non-transitory processor-readable storage medium having encoded therein executable code of one or more software programs, wherein the one or more software programs when executed by at least one processing device perform the following steps:

obtaining one or more detected states of a plurality of data samples in temporal data, wherein each of the data samples in said temporal data has a corresponding detected state;

obtaining a likelihood that each of said data samples belongs to said corresponding detected state;

obtaining a distribution of the likelihoods of the data samples indicating a number of observations of each of a plurality of likelihood values;

training, by at least one processing device, using a supervised learning technique, and using a training dataset comprising the distribution of the likelihoods, a plurality of anomaly thresholds, and a corresponding quality score for each anomaly threshold of the plurality of anomaly thresholds indicating a performance of detecting anomalies in the plurality of data samples using the corresponding anomaly threshold, a first machine learning model, wherein training the first machine learning model comprises adjusting one or more parameters of the first machine learning model to predict the corresponding quality score for each combination of: (i) the distribution of the likelihoods and (ii) each of the anomaly thresholds;

selecting, by the at least one processing device and using the first machine learning model, at least one anomaly threshold to apply to new temporal data samples; and configuring a second machine learning model for anomaly detection using at least the selected at least one anomaly threshold, wherein the second machine learning model for anomaly detection is applied to detect anomalies in the new temporal data samples.

9. The computer program product of claim 8, wherein the distribution of the likelihoods is an aggregation of the likelihoods that each data sample belongs to said corresponding detected state.

10. The computer program product of claim 8, further comprising the step of clustering the data samples from the temporal data into a plurality of clusters using temporal information, wherein each of the plurality of clusters corresponds to one detected state.

11. The computer program product of claim 8, wherein the likelihood comprises a log likelihood.

12. The computer program product of claim 8, further comprising a testing phase that evaluates a performance of the second machine learning model for anomaly detection on new labeled temporal data samples.

13. The computer program product of claim 8, wherein the second machine learning model for anomaly detection detects anomalies in the new temporal data samples by comparing one or more of the new temporal data samples to the selected at least one anomaly threshold.

14. An apparatus, comprising:
a memory; and
at least one processing device, coupled to the memory, operative to implement the following steps:

obtaining one or more detected states of a plurality of data samples in temporal data, wherein each of the data samples in said temporal data has a corresponding detected state;

obtaining a likelihood that each of said data samples belongs to said corresponding detected state;

obtaining a distribution of the likelihoods of the data samples indicating a number of observations of each of a plurality of likelihood values;

training, by at least one processing device, using a supervised learning technique, and using a training dataset comprising the distribution of the likelihoods, a plurality of anomaly thresholds, and a corresponding quality score for each anomaly threshold of the plurality of anomaly thresholds indicating a performance of detecting anomalies in the plurality of data samples using the corresponding anomaly threshold, a first machine learning model, wherein training the first machine learning model comprises adjusting one or more parameters of the first machine learning model to predict the corresponding quality score for each combination of: (i) the distribution of the likelihoods and (ii) each of the anomaly thresholds;

selecting, by the at least one processing device and using the first machine learning model, at least one anomaly threshold to apply to new temporal data samples; and configuring a second machine learning model for anomaly detection using at least the selected at least one anomaly threshold, wherein the second machine learning model for anomaly detection is applied to detect anomalies in the new temporal data samples.

15. The apparatus of claim 14, wherein the distribution of the likelihoods is an aggregation of the likelihoods that each data sample belongs to said corresponding detected state.

16. The apparatus of claim 14, further comprising the step of clustering the data samples from the temporal data into a plurality of clusters using temporal information, wherein each of the plurality of clusters corresponds to one detected state.

17. The apparatus of claim 16, wherein the likelihood that each of said data samples belongs to said corresponding detected state is obtained from a probability distribution provided by the clustering step.

18. The apparatus of claim 14, wherein the likelihood comprises a log likelihood.

19. The apparatus of claim 14, further comprising a testing phase that evaluates a performance of the second machine learning model for anomaly detection on new labeled temporal data samples.

20. The apparatus of claim 14, wherein the second machine learning model for anomaly detection detects anomalies in the new temporal data samples by comparing one or more of the new temporal data samples to the selected at least one anomaly threshold.

* * * * *